United States Patent [19]
Ziegenfuss

[11] 3,950,759
[45] Apr. 13, 1976

[54] PORTABLE INSTRUMENT FOR RECORDING ELECTRICAL LOAD CURRENT AND OPERATING DURATION

[75] Inventor: Edwin K. Ziegenfuss, Bethlehem, Pa.

[73] Assignee: Bethlehem Steel Corporation, Bethlehem, Pa.

[22] Filed: Jan. 8, 1975

[21] Appl. No.: 539,477

[52] U.S. Cl. ............... 346/33 R; 346/113; 346/116
[51] Int. Cl.² ................. G01D 9/00; G01D 15/16
[58] Field of Search ......... 346/33 R, 33 MC, 113, 346/116-119; 58/145 R, 147

[56] References Cited
UNITED STATES PATENTS

| | | | |
|---|---|---|---|
| 1,839,608 | 1/1932 | Smith | 346/113 X |
| 1,938,499 | 12/1933 | Ragsdale | 346/113 X |
| 2,340,114 | 1/1944 | Duis | 346/33 R X |
| 2,366,548 | 1/1945 | Oestreicher et al. | 58/145 R |
| 2,700,134 | 1/1955 | Stewart et al. | 346/33 R X |
| 2,988,415 | 6/1961 | Jeglum et al. | 346/33 R |
| 3,359,561 | 12/1967 | Shostek | 346/33 R X |
| 3,631,518 | 12/1971 | Battaglia | 346/145 |

OTHER PUBLICATIONS

"Resistance Welding/Aircraft", Welding Handbook, Section Five, pp. 92.21 to 92.23, Fourth Edition, published 1961 by American Welding Society.

Primary Examiner—George H. Miller, Jr.
Attorney, Agent, or Firm—Joseph J. O'Keefe; John I. Iverson; George G. Dower

[57] ABSTRACT

Self-contained portable recording instrument is particularly useful at field sites for recording the magnitude of both welding current and operating duration. A second embodiment is adapted to record the magnitude of welding current, voltage and operating duration. Strip chart records provide analysts with means for determining operator incentive pay when working on field assignments. Records enable determining the quality and duration of actual welds, as well as the occurrence of operator-simulated welding time.

20 Claims, 4 Drawing Figures

PORTABLE INSTRUMENT FOR RECORDING ELECTRICAL LOAD CURRENT AND OPERATING DURATION

BACKGROUND OF THE INVENTION

1. Field of the Invention

This invention relates broadly to portable recording apparatus. More particularly, this invention relates to portable apparatus for recording characteristics of electrical load current, operating duration, and load voltage if desired, as they occur in either direct current (DC) or alternating current (AC) circuits, preferably electric arc welding circuits.

2. Description of the Prior Art

In production shops having electric arc welding facilities, welding operators generally receive an incentive pay based on, among other factors, the size and quantity of welding rods deposited on a workpiece and the operating duration related to such tasks. There are known relationships between welding rod size and load current drawn, and quantity of rods used and operating duration.

Supervisory personnel monitor a welding operator's performance by observing the quality of his weldments to determine if the proper load current, and at times load voltage, has been used for a given welding task. Supervisors also tally the welding operator's welding time which, in some prior art installations, is accumulated on electrically-driven time registers. Each register acts automatically in response to the welding load current and/or load voltage fed from a shop welding power source. The registers themselves are powered from another conventional plant source. Therefore, with the supervisor in effect observing load current and tallying welding duration, there is little questionable basis for determining the welding operator's incentive pay.

However, welding operators are frequently called upon to perform field welding tasks at a variety of plant sites. Generally, there is no production shop welding or timing power sources, a time register, or a welding shop supervisor available at these sites. Consequently, a welding operator is dispatched to the field site with a portable welding machine and instructed to tally the size and quantity of welding rod used as well as the operating duration of his welding tasks. A problem arises concerning the exact amount of incentive pay to be made because some welding operators file a questionable tally with supervisory personnel. Another problem arises when, on occasion a portable welding machine is equipped with a welding time register, the welding operator may short circuit the machine output for a period of time to simulate welding time on the time register, and therefore enhance his incentive pay, without performing any acts of welding. This is a questionable practice that has far greater consequences than in just erroneously determining incentive pay for the welding operator.

SUMMARY OF THE INVENTION

One of the objects of this invention is to provide a portable instrument for recording characteristics of electrical load current, operating duration and, if desired, load voltage.

Another object of this invention is to provide the aforesaid portable recording instrument with a record drive adapted to record operating duration at any site independently of an external power source for the record drive.

A further object of this invention is to provide the aforesaid portable recording instrument with a record media which distinguishes actual from simulated arc welding load currents and operating duration, thereby permitting subsequent analysis to determine the quality of weldments and operator incentive pay.

The foregoing objects are attainable, for example, at any arc welding site, by a portable recording instrument having a hand-carried housing which incorporates separate means for detecting external load current and level of load current and producing separate load current and operating duration signals in response thereto, and including a strip chart recorder carried in said housing for recording the characteristics of the load current signal under control of the operating duration signal, and further including a self-contained power pack in the housing which includes a battery for powering the record drive of said strip chart recorder. The recorder may be modified to include a voltage channel to record the voltage characteristics of the external load current source. Subsequent analysis by supervisory personnel of all characteristics recorded on the record media determines the quality of weldments and operator incentive pay earned at each given site.

DESCRIPTION OF THE PREFERRED EMBODIMENTS

Figure 1:
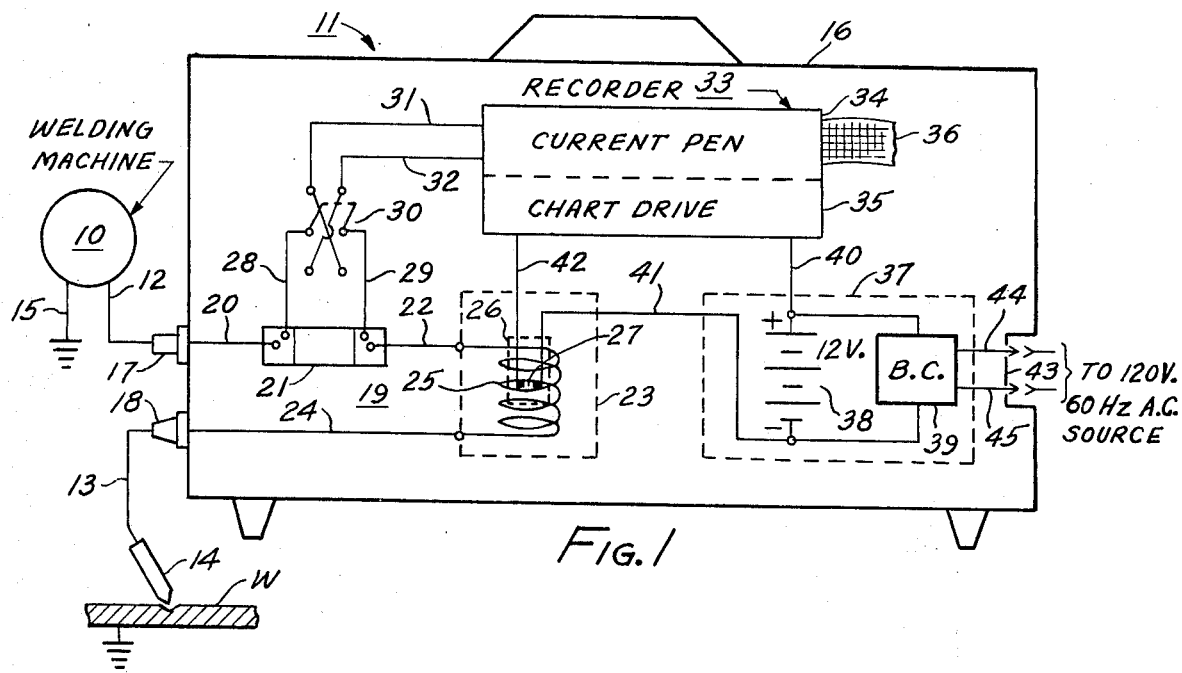
FIG. 1 is a schematic diagram of one embodiment of a portable recording instrument of the present invention.

Referring to FIG. 1, there is shown a conventional portable DC welding machine 10 dispatched to a field site to provide a source of electric arc welding power for arc welding workpiece W. Welding machine 10 may, for example, have a 600 amp. DC capacity and an output voltage which varies from about 80 to 30 volts DC between no-load and full-load current, respectively.

Welding load current and operating duration are sensed and recorded in portable recorder 11. Welding machine 10 causes load current to flow through machine hot lead 12, through current responsive circuits inside recorder 11, through electrode lead 13, welding rod electrode 14, into workpiece W and back to machine ground lead 15 by way of the ground path shown symbolically in FIG. 1. During actual welding operations, load current flows whenever an arc is struck and maintained between electrode 14 and workpiece W. This causes welding rod to melt and be deposited in a joint in workpiece W. Arc sputtering normally occurs during actual welding operations and consequently causes the load current to fluctuate about a nominal value. There is a different nominal value associated with each different welding rod size.

Load current also flows through the current responsive circuits in recorder 11 when arc welding is simulated by an operator, for example, when electrode lead 13 is connected directly to ground lead 15 to short-circuit the output of welding machine 10. Under simulated conditions, the load current characteristic is smooth as opposed to the fluctuating value associated with actual welding operations. Both smooth and fluctuating load current characteristics are shown in the record media illustrated in FIG. 3.

Portable recorder 11 includes a hand-carried housing 16, shown diagrammatically in FIG. 1, which is adapted to house current responsive, recording and other elements of the present invention. Female and male "CAM-LOK" receptacles 17 and 18 mounted on housing 16 permit current responsive circuit means 19 mounted in housing 16 to be detachably connected to external load current source 10 by way of welding machine hot lead 12 and electrode lead 13.

Current responsive circuit means 19 includes serially-connected lead 20, DC shunt 21, lead 22, current relay 23 and lead 24, leads 20 and 24 being wired respectively to receptacles 17 and 18. Shunt 21 may be a RUSTRAK Model No. 881 or any other type that will preferably provide a 100 mv. DC output with a 600 amp. DC current flow. Current relay 23 consists of a conventional 600 amp. DC edge-wound magnetic blow-out coil 25 surrounding a hermatically-sealed magnetic reed switch 26, the latter being supplied by GORDOS Co. Model No. MR-906 90/95. Magnetic reed switch has a set of normally-open contacts 27 that are adjusted to close at a minimal load current level, which level is preset by adjusting the position of switch 26 along the axis of magnetic coil 25.

The DC multivolt output from shunt 21 varies as a function of load current flowing in circuit means 19 and will be referred to hereinafter as the load current signal. This signal is fed over leads 28 and 29 to polarity reversing switch 30 which is set in either extreme position so as to maintain a uniform polarity of the load current signal on leads 31 and 32, regardless of the actual polarity of hot lead 12.

Figure 3:
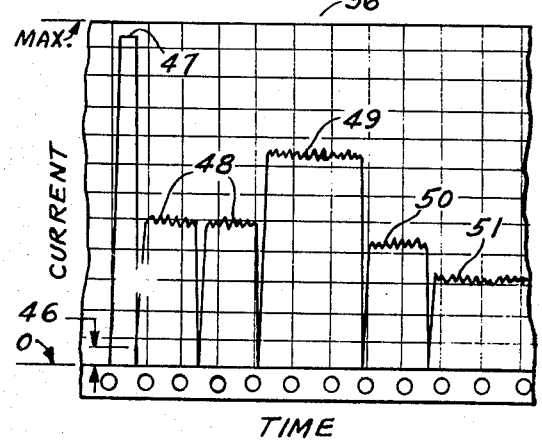
FIGS. 3 and 4 illustrate strip chart recordings produced when using the FIG. 1 and 2 embodiments of the present invention, respectively.

Mounted on housing 16 is DC strip chart recording ammeter 33 which includes current pen 34 circuited to receive the 0–100 mv. load current signal over leads 31 and 32 and is provided with a corresponding 0–600 amp. full scale. Recorder 33 also includes strip chart record drive 35, preferably with a 12 v. DC motor, and strip chart record 36 upon which current pen 34 produces load current traces as illustrated in FIG. 3 and described below. Recorder 33 may be a RUSTRAK Model No. 288 having a self-powered chopper-type stylus which corresponds to current pen 34.

Chart drive 35 is powered from power pack 37, such as RUSTRAK Model No. 154A-12-4000, which is also mounted in housing 16 and includes a rechargeable 12 volt DC battery 38 and a battery charger 39. Lead 40 connects one terminal of battery 38 directly to chart drive 35. Lead 41 connects the other terminal of battery 38 to contacts 27 of current relay 23 and lead 42 connects contacts 27 to chart drive 35, thereby establishing current relay 23 as the controller of chart drive 35. Battery charger 39 is adpated to be energized externally by plugging a 120 v., 60 Hz. AC source into receptacle 43 and conducting this source to battery charger 39 over leads 44 and 45.

Operation of portable recorder 11 shown in FIG. 1 will now be described with reference also being made to the resulting arc welding load current trace recorded on strip chart record 36 which is illustrated in FIG. 3. A strip chart recording is preferred over an operator tallying a time register for several reasons. First, supervisory personnel may not always be available to oversee all field welding activities, yet the strip chart record will provide an authentic record for subsequent analysis. Second, the strip chart record provides a permanent record to determine the quality of field weldments performed by various welding operators. Third, the strip chart record permits supervisory personnel to accurately determine each welding operator's incentive pay based on the size and quantity of welding rods consumed in field activities as well as the true operating duration of such activities.

Generally, regardless of the characteristics of load current flowing through current responsive circuit means 19, any increase, decrease, or variation in load current sensed by shunt 21 will cause current pen 34 to produce a corresponding trace on strip chart record 36. When load current increases from zero to a minimal value shown at level 46, or decreases from level 46 to zero, a corresponding closing or opening of current relay contacts 27 takes place which starts or stops chart drive 35, respectively. Thus, the starting and stopping of chart drive 35 corresponds to the beginning and ending respectively of the operating duration associated with the load current being sensed. Supervisory personnel subsequently analyze strip chart record 36 and tally individual operating events to determine the total operating time of the welding operator identified with strip chart record 36.

When a simulated arc welding operation occurs, load current maximizes and current pen 34 produces a smooth maximum current trace on strip chart record 36 at level 47 for the duration of such activity. Such events are subtracted from the total operating duration recorded on strip chart 36 to determine the welding operator's actual incentive pay.

Actual arc welding operations are exemplified in several ways on strip chart record 36 shown in FIG. 3. Each actual welding operation is characterized by a fluctuating trace produced by current pen 34 on strip chart record 36. For example, FIG. 3 shows a first welding rod of a given size held in electrode 14 which causes the load current trace to rise to nominal level 48 and be maintained at that level until the electric arc is broken and the current trace is returned to zero. After the arc is struck again, the load current trace again rises to the same level (48) signifyng the first size rod was used again. A second size welding rod, larger than the first size rod, was used to cause the load current trace to rise to the nominal level at 49 above level 48. Third and fourth different size welding rods, each smaller than the first size rod, were used to cause the load current trace to rise to respective nominal levels 50 and 51 below level 48.

Thus, by analyzing strip chart record 36 the quality of weldment may be determined by comparing each level of load current with known standards for different rod sizes and for performing the welding tasks required of the welding operator. Further, the number of each size welding rod used by the welding operator may be determined by tallying each of the different nominal values of load current and comparing them with known durations for each size rod. In addition, actual operating duration may be determined by subtracting the simulated operating duration from the total operating duration obtained above. Therefore, all of the above-mentioned factors involved in welding operator incentive pay may be determined by supervisory personnel analyzing strip chart record 36.

Figure 2:
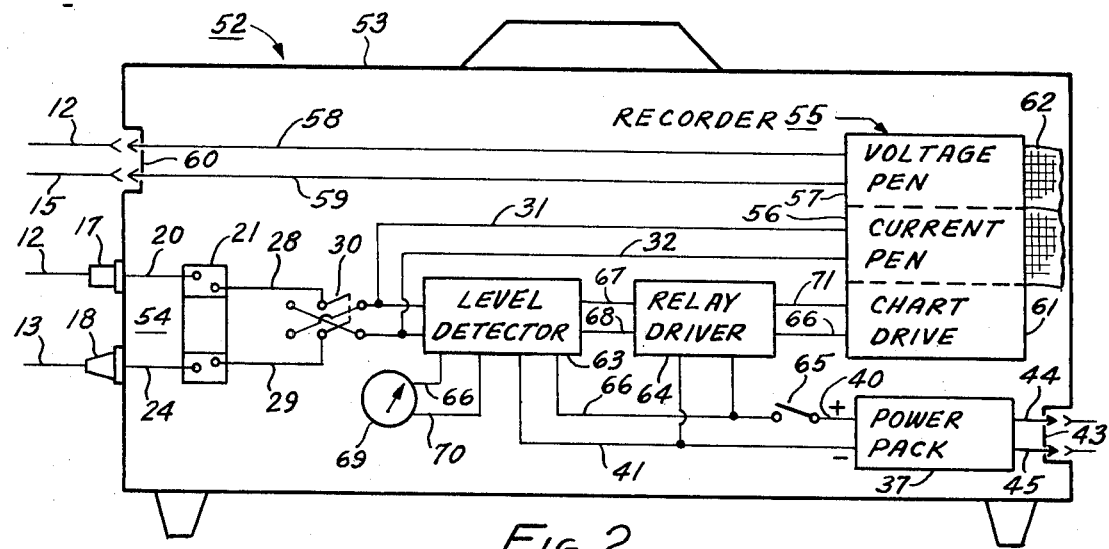
FIG. 2 is a schematic diagram of another embodiment of a portable recording instrument of the present invention.

Turning now to FIG. 2, there is shown an improved version of the FIG. 1 embodiment in which common components are identified by the same reference numbers as in the FIG. 1 embodiment. However, in the FIG. 2 embodiment, welding load current and operating duration as well as load voltage, are sensed and recorded in portable recorder 52 as a means for better determining quality of weldments and operator incentive pay.

Portable recorder 52 includes housing 53, shown diagrammatically in FIG. 2, which is adapted to house current responsive, voltage responsive, recording and other elements of the present invention. Female and male "CAM-LOC" receptacles 17 and 18 mounted on housing 53 permit current responsive circuit means 54 mounted in housing 53 to be detachably connected to external load current source 10 (not shown) by way of welding machine hot lead 12 and electrode lead 13.

Current responsive circuit means 54 includes serially connected lead 20, 600 amp. DC shunt 21, and lead 24, leads 20 and 24 being wired respectively to receptacles 17 and 18. There is no current relay in circuit means 54. However, there are other circuit means described below for detecting the minimal value of load current as did a current relay in the embodiment of FIG. 1.

The DC millivolt output from shunt 21 varies as a function of load current flowing in circuit means 54 and will also be referred to hereinafter as the load current signal. This signal is fed over leads 28 and 29 to polarity reversing switch 30 which is set in either extreme position so as to maintain a uniform polarity of the load current signal on leads 31 and 32, regardless of the actual polarity of hot lead 12.

Figure 4:
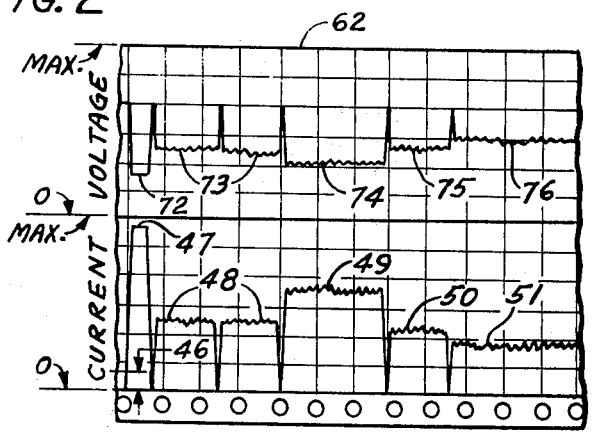

Mounted in housing 53 is a two-channel DC strip chart recording ammeter/voltmeter 55 which includes current pen 56 circuited to receive a 0–100 mv. load current signal over leads 31 and 32 and is provided with a 0–600 amp. scale in a first half-portion of recorder 55 full scale width. Also included in recorder 55 is a voltage pen 57 circuit to receive a load voltage signal over leads 58 and 59, which are wired to receptacle 60, and is provided with say a 0–150 volt scale in a second half-portion of recorder 55 full scale width. Recorder 55 also includes strip chart record drive 61, preferably with a 12 v. DC motor, and strip chart record 62 upon which current pen 56 and voltage pen 57 produce respective load current and load voltage traces on different halves thereof as shown in FIG. 4 and described below. Recorder 55 may be a RUSTRAK dual pen Model No. 291 having self-powered chopper-type styluses which correspond to current pen 56 and voltage pen 57.

Chart drive 61, together with level detector 63 and relay driver 64, both conventional solid state devices, are powered from 12 volt DC power pack 37 through lead 41 and on-off switch 65, the latter being connected between leads 40 and 66. Power pack 37 is energizable externally as noted above by plugging a 120 volt, 60 Hz AC source into receptacle 43 and conducting this source over leads 44 and 45 to power pack 37.

Level detector 63 receives the load current signal from shunt 21 by way of leads 31 and 32 and provides a step-type output signal on leads 67 and 68. This step-type output signal occurs whenever a minimum value of load current exceeds a level detector reference voltage, otherwise there is no output signal. The level detector reference voltage is developed from power pack 37, fed over switched lead 66 and preset by reference voltage adjuster 69 and then fed over lead 70 for comparison with the load current signal in level detector 63.

Relay driver 64 is fed the step-type output signal from level detector 63 by way of leads 67 and 68 and includes a relay which becomes energized during the presence of the step-type output signal, otherwise it remains deenergized. Relay contacts close when the relay is energized and switch power fed from power pack 37 over lead 41 to output lead 71 which, together with lead 66, are connected to chart drive 61. Thus, the level detector 63 and relay driver 64 combination function at a minimal value of load current to control chart drive 61 in a similar manner as current relay 23 does in the embodiment of FIG. 1.

Operation of portable recorder 52 shown in FIG. 2 will now be described with reference also being made to the resulting arc welding load current and load voltage traces recorded on strip chart record 62 and illustrated in FIG. 4. The same examples, including magnitude and duration, of arc welding load current will be used herein as were used in the description of the FIG. 1 embodiment. The only difference being that the load current traces have been compressed into one-half scale on strip chart 62 so as to provide the other half of strip chart 62 for recording load voltage traces. The addition of a load voltage trace to a load current trace enables an analyst of strip chart record 62 to compare the power used in each arc welding operation with known standards for the welding tasks, and thereby better determine the quality of weldment and operator incentive pay.

In general, regardless of the characteristics of load current flowing through current responsive means 54, any increase, decrease or variation in load current sensed by shunt 21 will cause current pen 56 to produce a corresponding current trace on strip chart record 62. When load current increases from zero to a minimal value which is preset by adjuster 69 and shown at level 46, or decreases from level 46 to zero, a corresponding step-type output signal from level detector 63 and contact closure or opening of relay contacts in driver relay 64 takes place which starts or stops chart drive 62 respectively. Thus, the starting and stopping of chart drive 62 corresponds to the beginning and ending respectively of the operating duration associated with the load current being sensed in circuit means 54. Supervisory personnel subsequently analyze strip chart record 62 and tally individual operating events to determine the total operating time of the welding operator identified with strip chart record 62.

When a simulated arc welding occurs, load current maximizes and current pen 56 produces a smooth maximum current trace on record 62 at level 47 for the duration of such activity. These events are subtracted from the total operating duration recorded on record 62 in determining the welding operator's actual incentive pay.

Actual arc welding operations are exemplified in several ways, each by a fluctuating trace produced by current pen 56 on record 62. For example, FIG. 4 shows welding rods of various sizes held in electrode 14 (not shown) cause load current traces to rise to respective nominal levels 48, 49, 50 and 51 and be maintained at that level until the electric arc is broken and the current trace is returned to zero, all as noted above.

Simultaneously, the load voltage of welding machine 10 (not shown) generally falls off with increases in load current. For example, welding machine 10 may be set up to regulate load voltage from about 80 volts DC at no load to about 30 volts DC at 600 amp. DC load current. During simulated welding operations, load voltage minimizes and voltage pen 57 produces a smooth minimum trace on strip chart record 62 at level 72 for the duration current pen 56 maximizes at level 47. When various actual welding operations occur, load voltage falls and voltage pen 57 produces fluctuating traces on record 62, for example, at nominal levels 73, 74, 75 and 76 which correspond to the levels and durations of current pen 56 traces at levels 48, 49, 50 and 51.

Subsequently, the strip chart record 62 shown in FIG. 4 is analyzed to determine the quality of weldments, based on both load current and load voltage, the number and size of welding rods consumed by the welding operator, and the welding operator's incentive pay, all as noted above. Analysis of the load voltage trace on strip chart record 62 will also provide a basis for determining if the regulator system in the arc welding power source has been set properly and is functioning properly.

In the foregoing description reference has been made, for exemplary purposes, to the recording of DC load current and load voltages. It will be readily appreciated that the invention may be practiced in alternating current (AC) welding circuits simply by substituting conventional current transformers for shunts, and including conventional instrument rectifiers either internal or external to the strip chart recorders carried by the portable recorder housings.

I claim:
1. Portable apparatus for recording electrical load current and operating duration, comprising:
 a. a portable housing adapted to accommodate elements of said apparatus,
 b. means operatively associated with said electrical load for producing separate load current and operating duration signals,
 c. means for recording said load current signal and including a record drive movable only under control of said operating duration signal, and
 d. a source within said housing for powering said recorder record driver.

2. The apparatus of claim 1 wherein means (b) is adapted to produce the operating duration signal in response to a predetermined magnitude of the load current signal.

3. The apparatus of claim 1 wherein means (b) includes a shunt for producing a DC load current signal.

4. The apparatus of claim 1 wherein means (b) includes means for producing the load current signals connected in series with a current relay for producing the operating duration signal.

5. The apparatus of claim 1 wherein source (d) is a battery in said housing.

6. The apparatus of claim 1 wherein source (d) is a battery, and further including: (e) means in said housing for charging said battery from an external source.

7. The apparatus of claim 1 wherein means (b) includes a current transformer for producing an AC load current signal and means responsive to the AC load current signal for producing the operating duration signal.

8. The apparatus of claim 7 wherein the means for producing the operating duration signal is a relay connected to the output of said current transformer.

9. The apparatus of claim 7 wherein the means for producing the operating duration signal is a signal level detector connected to the output of said current transformer.

10. The apparatus of claim 1 wherein means (b) includes a shunt for producing a DC load current signal and means responsive to the DC load current signal for producing the operating duration signal.

11. The apparatus of claim 4 wherein the means for producing the operating duration signal is a current relay.

12. The apparatus of claim 10 wherein the means for producing the operating duration signal is a current relay consisting essentially of a magnetic-flux producing coiled conductor surrounding a magnetic reed switch.

13. The apparatus of claim 10 wherein the means for producing the operating duration signal is a relay connected to the output of said shunt.

14. The apparatus of claim 10 wherein the means for producing the operating duration signal is a signal level detector connected to the output of said shunt.

15. Portable apparatus for recording electrical load current and operating duration, comprising:
 a. a portable housing adapted to accommodate elements of said apparatus,
 b. input and output circuit connectors adapted to be connected to a load current source and said load, respectively,
 c. means operatively associated with said input and output connectors for producing a load current signal,
 d. means operatively associated with means (c) for producing an operating duration signal,
 e. means for recording said load current signal and including a record drive movable only under control of said operating duration signal, and
 f. a source within said housing for powering said recorder record drive.

16. The apparatus of claim 15 wherein source (f) is a battery.

17. The apparatus of claim 15 wherein source (f) is a battery, and further including: (g) means in said housing for charging said battery from an external source.

18. Portable apparatus for recording DC arc welding current and operating duration, comprising:
 a. a portable housing adapted to acommodate elements of said apparatus,
 b. input and output cable connectors adapted to be connected to a DC current source and a welding rod holder, respectively,
 c. a shunt for producing a DC arc current signal,
 d. a current relay connected in series with said shunt across said input and output connectors for producing an operating duration signal,
 e. a strip chart recorder for recording the DC arc current signal and including a chart drive movable only under control of said operating duration signal, and
 f. a battery within said housing for powering said chart drive.

19. Portable apparatus for recording AC arc welding current and operating duration, comprising:
 a. a portable housing adapted to accommodate elements of said apparatus, b. input and output cable connectors adapted to be connected to an AC current source and a welding load, respectively, c. a current transformer for producing an AC load current signal, d. a current relay connected in series with said current transformer across said input and output connectors for producing an operating duration signal, e. a strip chart recorder for recording the AC load current signal and including a chart drive movable only under control of said operating duration signal, and f. a battery within said housing for powering said chart drive.

20. Portable apparatus for recording electrical load current, load voltage and operating duration, comprising:

a. a portable housing adapted to accommodate elements of said apparatus, b. means operatively associated with said electrical load for producing separate load current, load voltage and operating duration signals, c. means for separately recording said load current and load voltage signals on a common record and including a record drive movable only under control of said operating duration signal, and d. a source within said housing for powering said recorder record drive.

* * * * *